(12) United States Patent
Ford

(10) Patent No.: US 11,920,275 B2
(45) Date of Patent: Mar. 5, 2024

(54) METHOD OF OPERATING A CONTROL PANEL OF A LAUNDRY APPLIANCE

(71) Applicant: Haier US Appliance Solutions, Inc., Wilmington, DE (US)

(72) Inventor: James Augustine Ford, Fisherville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 494 days.

(21) Appl. No.: 17/177,714

(22) Filed: Feb. 17, 2021

(65) Prior Publication Data

US 2022/0259789 A1   Aug. 18, 2022

(51) Int. Cl.

| | |
|---|---|
| *D06F 34/28* | (2020.01) |
| *D06F 34/14* | (2020.01) |
| *D06F 34/30* | (2020.01) |
| *D06F 34/32* | (2020.01) |
| *G05B 19/042* | (2006.01) |
| *D06F 101/06* | (2020.01) |
| *D06F 101/12* | (2020.01) |
| *D06F 101/20* | (2020.01) |

(52) U.S. Cl.
CPC .............. *D06F 34/28* (2020.02); *D06F 34/14* (2020.02); *D06F 34/30* (2020.02); *D06F 34/32* (2020.02); *G05B 19/0426* (2013.01); *D06F 2101/06* (2020.02); *D06F 2101/12* (2020.02); *D06F 2101/20* (2020.02); *G05B 2219/2633* (2013.01); *G05B 2219/2642* (2013.01)

(58) Field of Classification Search
CPC ........................................................ D06F 34/28
See application file for complete search history.

(56) References Cited

U.S. PATENT DOCUMENTS 8,533,604 B1    9/2013  Parenti

FOREIGN PATENT DOCUMENTS

| | | |
|---|---|---|
| JP | 2011194115 A | 10/2011 |
| WO | WO2014038276 A1 | 3/2014 |
| WO | WO2019192889 A1 | 10/2019 |

*Primary Examiner* — Jason Y Ko

(74) *Attorney, Agent, or Firm* — Dority & Manning, P.A.

(57) ABSTRACT

A laundry appliance includes a cabinet and a control panel mounted on the cabinet, the control panel having a plurality of controls that each may be activated to permit manipulation by a user or deactivated to prevent manipulation by the user. A method of operating the laundry appliance includes obtaining a desired automation level, determining a set of active controls of the plurality of controls that are associated with the desired automation level, and activating the set of active controls on the control panel for manipulation by the user of the laundry appliance.

20 Claims, 7 Drawing Sheets

… (1)

METHOD OF OPERATING A CONTROL PANEL OF A LAUNDRY APPLIANCE

FIELD OF THE INVENTION

The present subject matter relates generally to laundry appliances, and more particularly to control panels of laundry appliances and methods of operating the same.

BACKGROUND OF THE INVENTION

Washing machine appliances generally include a wash tub for containing water or wash fluid, e.g., water and detergent, bleach, and/or other wash additives. A wash basket is rotatably mounted within the wash tub and defines a wash chamber for receipt of articles for washing, and an agitation element is rotatably mounted within the wash basket. Washing machine appliances are typically equipped to operate in one or more modes or cycles, such as wash, rinse, and spin cycles. For example, during a wash or rinse cycle, the wash fluid is directed into the wash tub in order to wash and/or rinse articles within the wash chamber. In addition, the wash basket and/or the agitation element can rotate at various speeds to agitate or impart motion to articles within the wash chamber, to wring wash fluid from the articles, etc.

Notably, the operation of a washing machine appliance is regulated by a controller based on user inputs, automated algorithms, and other inputs. Certain users prefer to have more control over the parameters of a particular operating cycle, while others may desire less interaction, preferring to throw in a load, press start, and allow automated algorithms to determine the appropriate parameters for a wash cycle. However, control panels on conventional laundry appliances include fixed rotary dials, push buttons, or control interfaces. Therefore, the operating parameters that a user may manipulate on the control panel may be too complex for one user and not complex enough for another user.

Accordingly, a laundry appliance including features for improving user interaction and control would be useful. More specifically, a system and method for operating a control panel of a laundry appliance in accordance with a user's preferences would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a laundry appliance is provided including a cabinet, a basket rotatably mounted within the cabinet and defining a chamber configured for receiving a load of clothes, a control panel mounted on the cabinet, the control panel including a plurality of controls, wherein each of the plurality of controls may be activated to permit manipulation by a user or deactivated to prevent manipulation by the user, and a controller operably coupled to the control panel. The controller is configured to obtain a desired automation level, determine a set of active controls of the plurality of controls that are associated with the desired automation level, and activate the set of active controls on the control panel for manipulation by the user of the laundry appliance.

In another exemplary embodiment, a method of operating a laundry appliance is provided. The laundry appliance includes a cabinet and a control panel mounted on the cabinet, the control panel including a plurality of controls, wherein each of the plurality of controls may be activated to permit manipulation by a user or deactivated to prevent manipulation by the user. The method includes obtaining a desired automation level, determining a set of active controls of the plurality of controls that are associated with the desired automation level, and activating the set of active controls on the control panel for manipulation by the user of the laundry appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
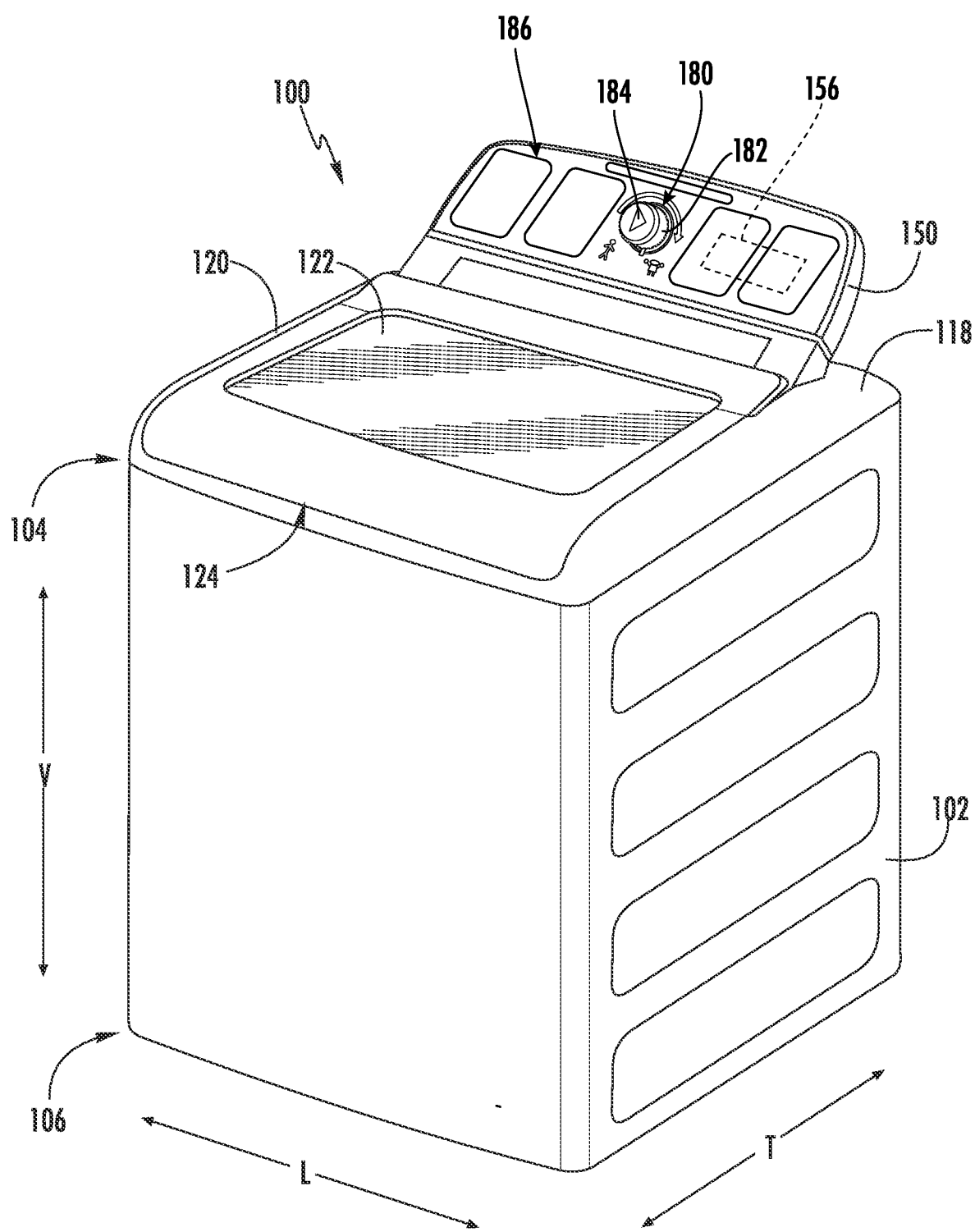
FIG. 1 provides a perspective view of a washing machine appliance according to an exemplary embodiment of the present subject matter with a door of the exemplary washing machine appliance shown in a closed position.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
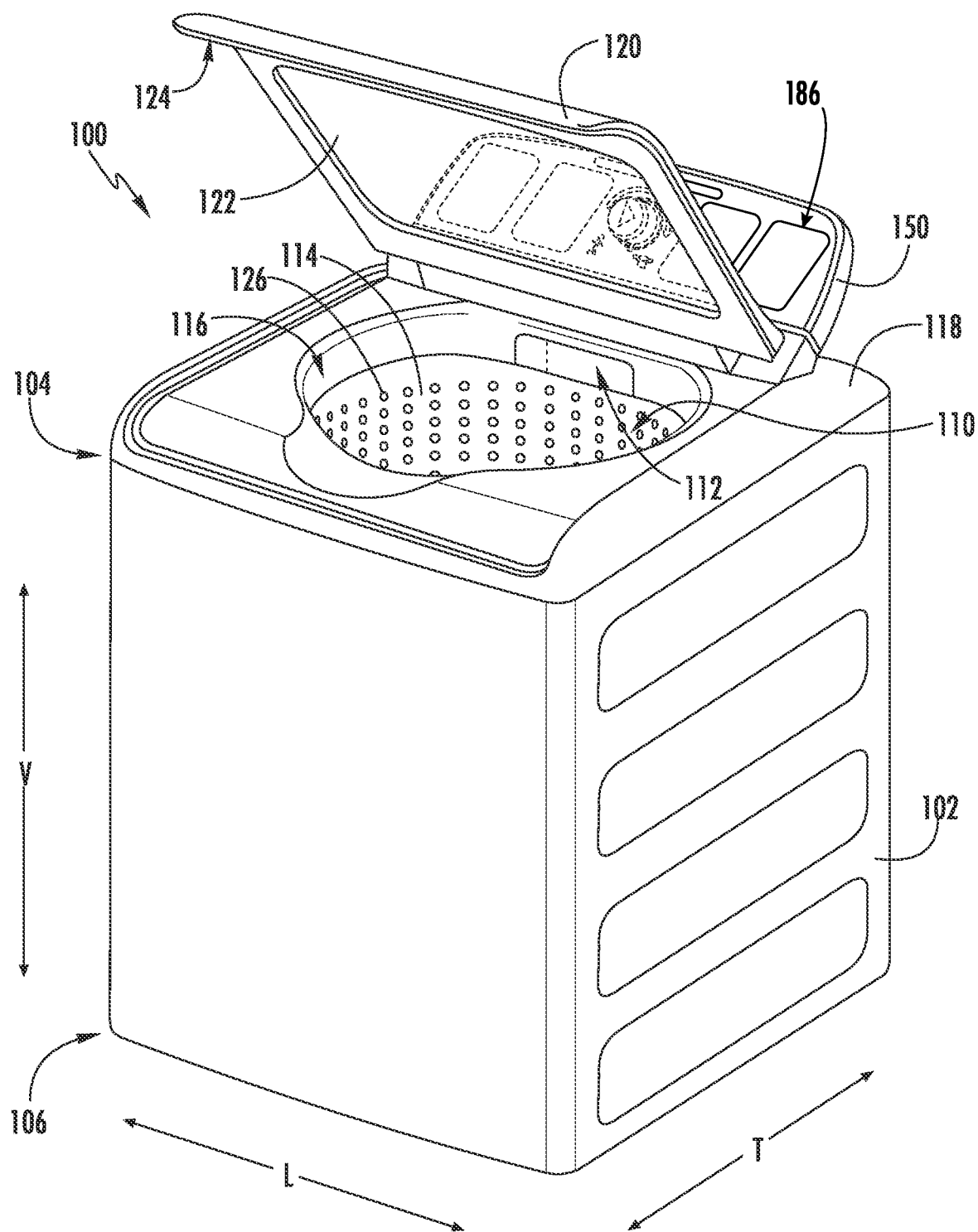
FIG. 2 provides a perspective view of the exemplary washing machine appliance of FIG. 1 with the door of the exemplary washing machine appliance shown in an open position.
Figure 3:
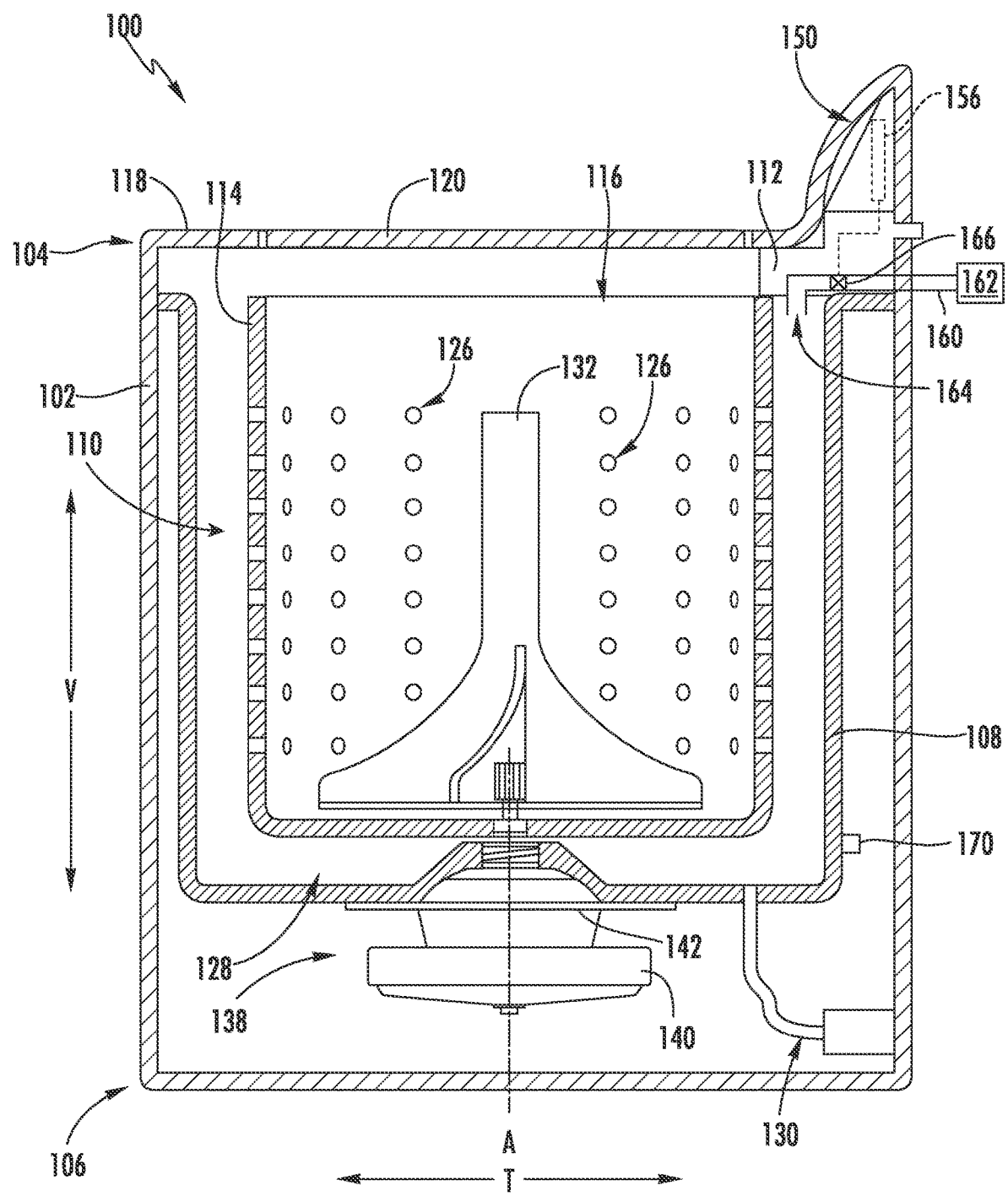
FIG. 3 provides a side cross-sectional view of the exemplary washing machine appliance of FIG. 1.

FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V, between a first side (left) and a second side (right) along the lateral direction L, and between a front and a rear along the transverse direction T. As best shown in FIG. 3, a wash tub 108 is positioned within cabinet 102, defines a wash chamber 110, and is generally configured for retaining wash fluids during an operating cycle. Washing machine appliance 100 further includes a primary dispenser 112 (FIG. 2) for dispensing wash fluid into wash tub 108. The term "wash fluid" refers to a liquid used for washing and/or rinsing articles during an operating cycle and may include any combination of water, detergent, fabric softener, bleach, and other wash additives or treatments.

In addition, washing machine appliance 100 includes a wash basket 114 that is positioned within wash tub 108 and generally defines an opening 116 for receipt of articles for washing. More specifically, wash basket 114 is rotatably mounted within wash tub 108 such that it is rotatable about an axis of rotation A. According to the illustrated embodiment, the axis of rotation A is substantially parallel to the vertical direction V. In this regard, washing machine appliance 100 is generally referred to as a "vertical axis" or "top load" washing machine appliance 100. However, it should be appreciated that aspects of the present subject matter may be used within the context of a horizontal axis or front load washing machine appliance as well. As used herein, terms of approximation, such as "approximately," "substantially," or "about," refer to being within a ten percent margin of error.

As illustrated, cabinet 102 of washing machine appliance 100 has a top panel 118. Top panel 118 defines an opening (FIG. 2) that coincides with opening 116 of wash basket 114 to permit a user access to wash basket 114. Washing machine appliance 100 further includes a door 120 which is rotatably mounted to top panel 118 to permit selective access to opening 116. In particular, door 120 selectively rotates between the closed position (as shown in FIGS. 1 and 3) and the open position (as shown in FIG. 2). In the closed position, door 120 inhibits access to wash basket 114. Conversely, in the open position, a user can access wash basket 114. A window 122 in door 120 permits viewing of wash basket 114 when door 120 is in the closed position, e.g., during operation of washing machine appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIGS. 2 and 3, wash basket 114 further defines a plurality of perforations 126 to facilitate fluid communication between an interior of wash basket 114 and wash tub 108. In this regard, wash basket 114 is spaced apart from wash tub 108 to define a space for wash fluid to escape wash chamber 110. During a spin cycle, wash fluid within articles of clothing and within wash chamber 110 is urged through perforations 126 wherein it may collect in a sump 128 defined by wash tub 108. Washing machine appliance 100 further includes a pump assembly 130 (FIG. 3) that is located beneath wash tub 108 and wash basket 114 for gravity assisted flow when draining wash tub 108.

An impeller or agitation element 132 (FIG. 3), such as a vane agitator, impeller, auger, oscillatory basket mechanism, or some combination thereof is disposed in wash basket 114 to impart an oscillatory motion to articles and liquid in wash basket 114. More specifically, agitation element 132 extends into wash basket 114 and assists agitation of articles disposed within wash basket 114 during operation of washing machine appliance 100, e.g., to facilitate improved cleaning. In different embodiments, agitation element 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 132 and wash basket 114 are oriented to rotate about axis of rotation A (which is substantially parallel to vertical direction V).

As best illustrated in FIG. 3, washing machine appliance 100 includes a drive assembly 138 in mechanical communication with wash basket 114 to selectively rotate wash basket 114 (e.g., during an agitation or a rinse cycle of washing machine appliance 100). In addition, drive assembly 138 may also be in mechanical communication with agitation element 132. In this manner, drive assembly 138 may be configured for selectively rotating or oscillating wash basket 114 and/or agitation element 132 during various operating cycles of washing machine appliance 100.

More specifically, drive assembly 138 may generally include one or more of a drive motor 140 and a transmission assembly 142, e.g., such as a clutch assembly, for engaging and disengaging wash basket 114 and/or agitation element 132. According to the illustrated embodiment, drive motor 140 is a brushless DC electric motor, e.g., a pancake motor. However, according to alternative embodiments, drive motor 140 may be any other suitable type or configuration of motor. For example, drive motor 140 may be an AC motor, an induction motor, a permanent magnet synchronous motor, or any other suitable type of motor. In addition, drive assembly 138 may include any other suitable number, types, and configurations of support bearings or drive mechanisms.

Referring still to FIGS. 1 through 3, a control panel 150 extends from top panel 118 and may be used to permit a user of washing machine appliance 100 to interact with the appliance and control the operating cycles and associated parameters. Thus, control panel 150 forms a user interface input for operator selection of machine cycles and features. A display may be provided on control panel 150 to indicate selected features, operation modes, a countdown timers, and/or other items of interest to appliance users regarding operation. Control panel 150 will be described below in more detail according to an exemplary embodiment of the present subject matter.

Operation of washing machine appliance 100 is controlled by a controller or processing device 156 that is operatively coupled to control panel 150 for user manipulation to select washing machine cycles and features. In response to user manipulation of control panel 150, controller 156 operates the various components of washing machine appliance 100 to execute selected machine cycles and features. According to an exemplary embodiment, controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of washing machine appliance 100 may be in communication with controller 156 via one or more signal lines or shared communication busses.

During operation of washing machine appliance 100, laundry items are loaded into wash basket 114 through opening 116, and washing operation is initiated through operator manipulation of control panel 150. Wash basket 114 is filled with water and detergent and/or other fluid additives via primary dispenser 112. One or more valves can be controlled by washing machine appliance 100 to provide for filling wash tub 108 and wash basket 114 to the appropriate level for the amount of articles being washed and/or rinsed. By way of example for a wash mode, once wash basket 114 is properly filled with fluid, the contents of wash basket 114 can be agitated (e.g., with agitation element 132 as discussed previously) for washing of laundry items in wash basket 114.

More specifically, referring again to FIG. 3, a water fill process will be described according to an exemplary embodiment. As illustrated, washing machine appliance 100 includes a water supply conduit 160 that provides fluid communication between a water supply source 162 (such as a municipal water supply) and a discharge nozzle 164 for directing a flow of water into wash chamber 110. In addition, washing machine appliance 100 includes a water fill valve or water control valve 166 which is operably coupled to water supply conduit 160 and communicatively coupled to controller 156. In this manner, controller 156 may regulate the operation of water control valve 166 to regulate the amount of water within wash tub 108. In addition, washing machine appliance 100 may include one or more pressure sensors 170 for detecting the amount of water and or clothes within wash tub 108. For example, pressure sensor 170 may be operably coupled to a side of tub 108 for detecting the weight of wash tub 108, which controller 156 may use to determine a volume of water in wash chamber 110 and a subwasher load weight.

After wash tub 108 is filled and the agitation phase of the wash cycle is completed, wash basket 114 can be drained, e.g., by drain pump assembly 130. Laundry articles can then be rinsed by again adding fluid to wash basket 114 depending on the specifics of the cleaning cycle selected by a user. The impeller or agitation element 132 may again provide agitation within wash basket 114. One or more spin cycles may also be used as part of the cleaning process. In particular, a spin cycle may be applied after the wash cycle and/or after the rinse cycle in order to wring wash fluid from the articles being washed. During a spin cycle, wash basket 114 is rotated at relatively high speeds to help wring fluid from the laundry articles through perforations 126. After articles disposed in wash basket 114 are cleaned and/or washed, the user can remove the articles from wash basket 114, e.g., by reaching into wash basket 114 through opening 116.

Referring now generally to FIGS. 1 through 7, a control panel 150 and associated method of operation that may be used to control operation of washing machine appliance will be described according to an exemplary embodiment. Control panel 150 may include a plurality of control inputs, input selectors, buttons, switches, touch panels, capacitive touch buttons, and other features that permit interaction with the user of washing machine appliance 100. Although an exemplary control panel 150 and control schematic is described herein, it should be appreciated that variations and modifications may be made to control panel 150 while remaining within the scope of the present subject matter.

As shown, control panel 150 may include a primary control input 180 that is generally configured for controlling a desired level of automation (as will be described in more detail below) as well as initiating or commencing an operating cycle. It should be appreciated that the primary control input 180 may be any suitable tactile button, switch, linear slider, touch panel, button, remote device, or any other suitable local or remote user interface that can be manipulated by the user.

Specifically, according to the illustrated embodiment, primary control input 180 includes a rotary dial 182 that may be rotated by a user of the appliance to select the desired automation level. In this regard, as explained in more detail below, a user may rotate rotary dial 182 counterclockwise to increase the number of user selected options or parameters for an operating cycle (e.g., a minimal automation mode or manual operation mode). By contrast, a user may rotate rotary dial 182 clockwise to decrease the number of user selected options or parameters for an operating cycle (e.g., a full automation mode or smart mode). Although only three desired levels of automation are described herein, it should be appreciated that any suitable number of automation levels may be used, each level including any suitable operating parameters that may be controlled within any suitable range.

According to the illustrated embodiment, in the center of rotary dial 182 is a start button 184. In this regard, start button 184 may be used to initiate an operating cycle based on the parameters selected by the user and/or based on automated cycle parameters and algorithms, as will be described in more detail below. Notably, according to exemplary embodiments of the present subject matter, the number of operating cycle parameters that may be manipulated or controlled by a user of the appliance may be increased or decreased to regulate the complexity of operation and control of washing machine appliance 100.

For example, certain users of washing machine appliance 100 may wish to have full control of all operating parameters such that the operating cycle may be carefully modified and optimized for the load type, size, or other desired load or performance characteristics. By contrast, other users may wish to have little or no input regarding the operating cycle, thereby relying heavily on automated cycle control algorithms to determine the desired or optimal cycle parameters. According to exemplary embodiments, a user of washing machine appliance 100 may rotate rotary dial 182 to control the desired level of automation and control panel 150 may display options for controlling the operating cycle in accordance with or corresponding to the desired level of automation.

Figure 5:
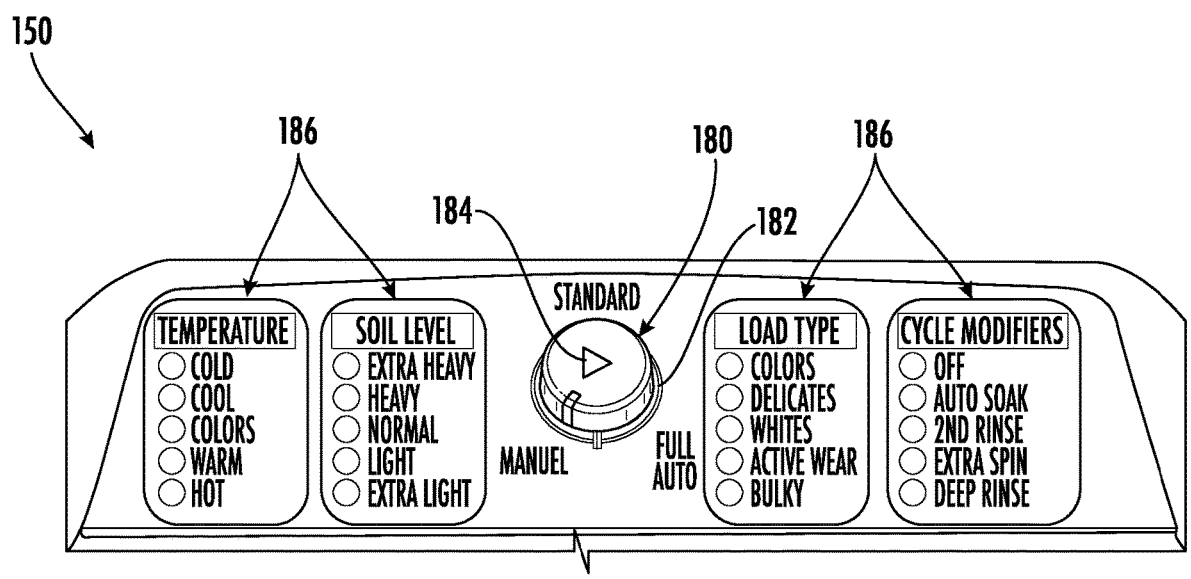
FIG. 5 provides a view of a control panel of a washing machine appliance implementing the exemplary method of FIG. 4, where a desired automation level is a minimal automation level (i.e., a manual operation mode) in accordance with an exemplary embodiment of the present subject matter.
Figure 6:
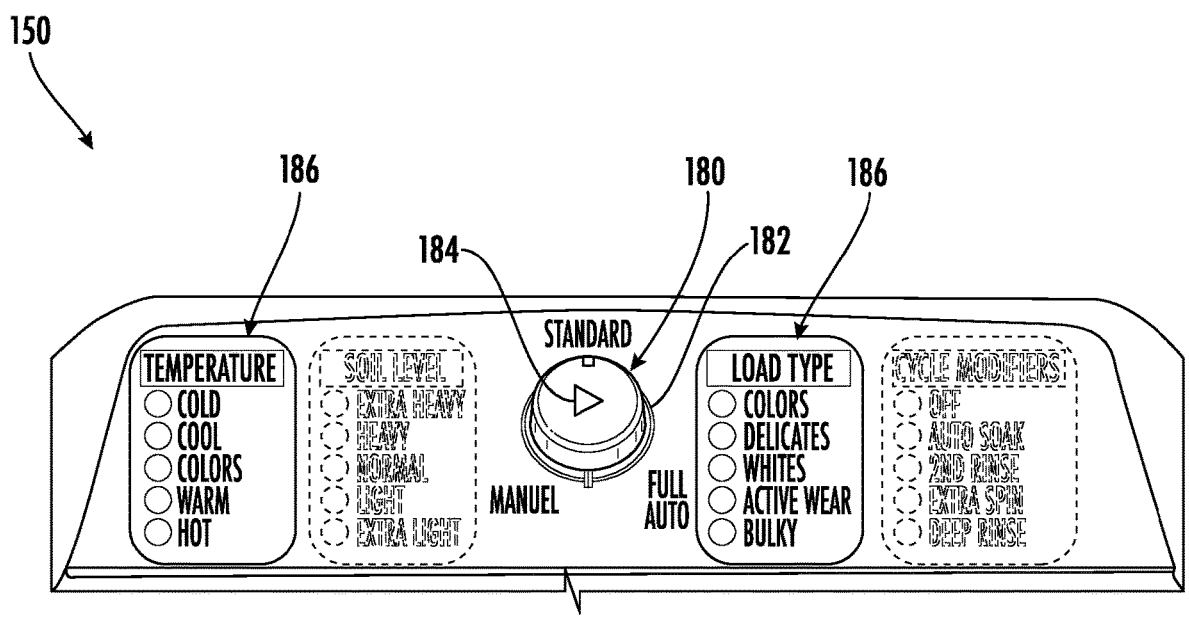
FIG. 6 provides a view of a control panel of a washing machine appliance implementing the exemplary method of FIG. 4, where the desired automation level is a full automation level in accordance with an exemplary embodiment of the present subject matter.
Figure 7:
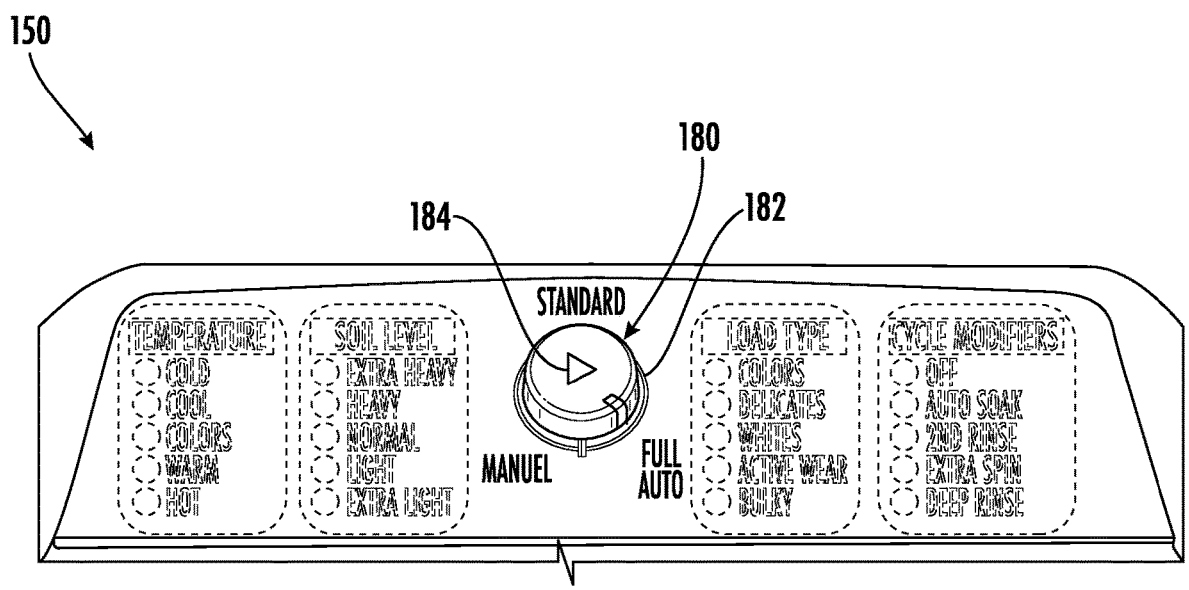
FIG. 7 provides a view of a control panel of a washing machine appliance implementing the exemplary method of FIG. 4, where the desired automation level is a moderate automation level in accordance with an exemplary embodiment of the present subject matter.

As best shown in FIGS. 5 through 7, control panel 150 may further include a plurality of controls 186 that permit user manipulation of specific operating cycle parameters. As used herein, "the plurality of controls 186," or more generally, "controls," are generally intended to refer to any control inputs that may be selected by a user of washing machine appliance other than the desired automation level (e.g., as controlled by rotary dial 182) and the initiation of an operating cycle (e.g., as controlled by start button 184). In this regard, for example, the plurality of controls 186 may include controls for regulating the level or temperature of wash water, the soil level of a load of clothes, a load type of the load of clothes, or for inputting other cycle modifiers, such as an auto soak cycle, a second rinse, an extra spin, a deep rinse, etc. It should be appreciated that the exemplary control actions and corresponding controls 186 described herein are only exemplary and intended for explaining aspects of the present subject matter. Variations and modifications may be made to control panel 150 and to the corresponding controls or control inputs while remaining within the scope of the present subject matter.

According to exemplary embodiments of the present subject matter, each of the plurality controls 186 may be independently activated or deactivated as desired by the user, e.g., based on the desired level of automation set by rotary dial 182. In this regard, a control of the plurality of controls 186 is considered to be "activated" or "active" when a user is capable of using that control to adjust the associated operating parameter for a subsequent operating cycle. By contrast, a control of the plurality of controls 186 is considered to be "deactivated" when a user is incapable of using that control to adjust the associated operating parameter for a subsequent operating cycle. The activation and deactivation of the plurality of controls 186 will be described below in more detail according to exemplary embodiments of the present subject matter.

It should be appreciated that the plurality of controls 186 may be any suitable number, type, technology, and configuration of control inputs or selector mechanisms. For example, according to the illustrated embodiment, each of the plurality of control input 186 may be a tactile input button or switch that permits a user to make a selection for each of a plurality of potential operating parameters or otherwise toggle through such parameters, such as temperature, soil level, load type, and cycle modifiers. By contrast, control panel 150 may include one or more touchscreen interfaces or a combination of capacitive touch buttons and digital display or static displays that may be selectively illuminated. According still other embodiments, control panel 150 and the plurality of controls 186 may include any suitable combination of toggle switches, push buttons, rotary dials, selective knobs, or other input mechanisms.

While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the present subject matter as well, e.g., horizontal axis washing machine appliances. In addition, aspects of the present subject matter may be utilized in a combination washer/dryer appliance. Indeed, it should be appreciated that aspects of the present subject matter may further apply to other laundry appliances, such a dryer appliance.

Now that the construction of washing machine appliance 100 and the configuration of controller 156 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as horizontal axis washing machine appliances, or other laundry appliances, such as a dryer appliance. In exemplary embodiments, the various method steps as disclosed herein may be performed by controller 156 or a separate, dedicated controller.

Figure 4:
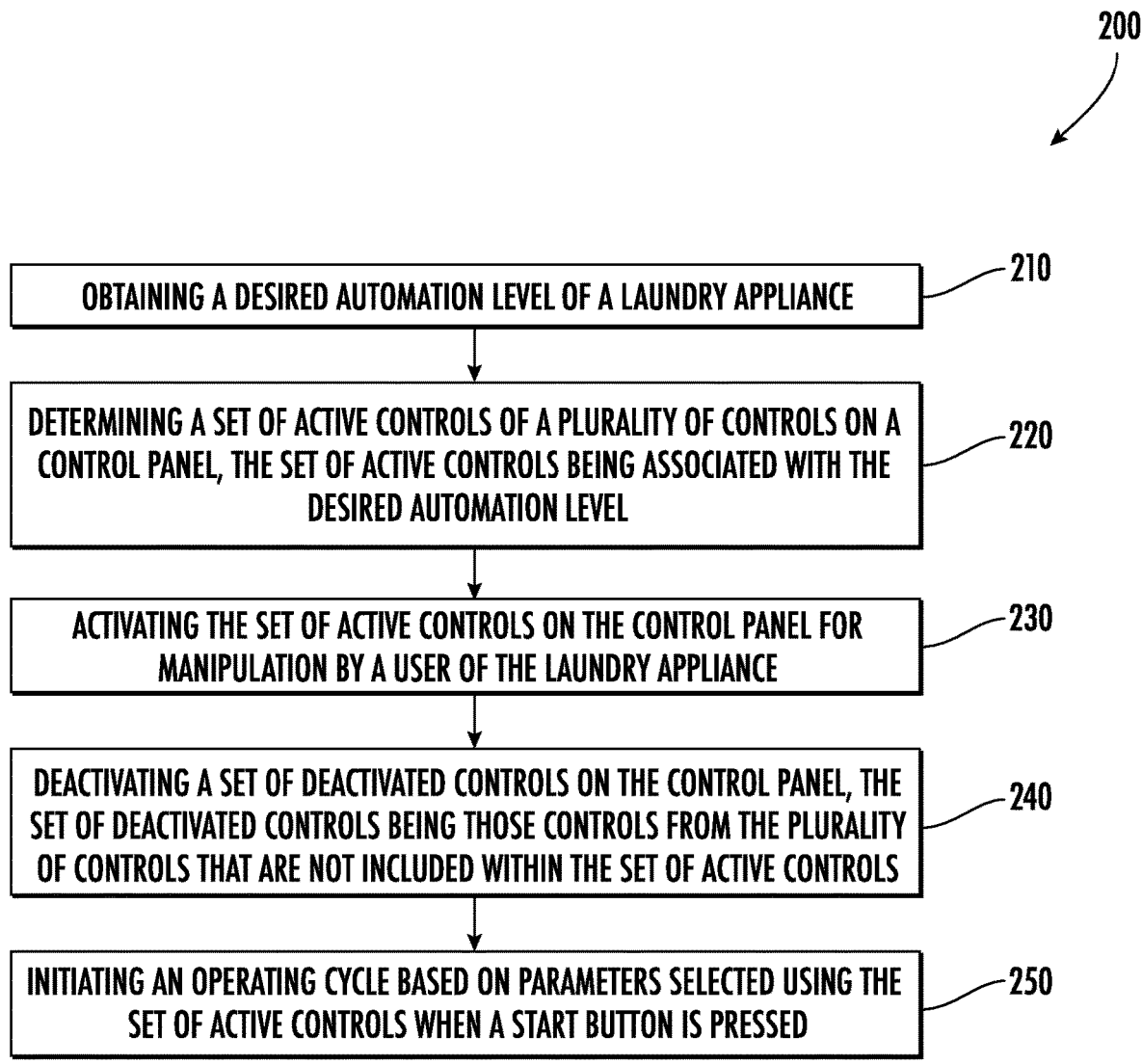
FIG. 4 illustrates a method for operating a laundry appliance in accordance with one embodiment of the present disclosure.

Referring now to FIG. 4, method 200 includes, at step 210, obtaining a desired automation level of a laundry appliance. For example, continuing the example from above, the user of the washing machine appliance 100 may select or input the desired level of automation using primary control input 180. More specifically, a user of washing machine appliance 100 may rotate rotary dial 182 until the desired level of automation is selected. Thus, according to exemplary embodiments, controller 156 may monitor the position of rotary dial 182 and may determine the desired automation level based on the position of rotary dial 182.

It should be appreciated that according to alternative embodiments, the desired automation level may be determined in any other suitable manner. For example, the desired automation level may be programmed by a user of washing machine appliance 100, may be determined based on the time of day at which a wash cycle is initiated, or may be determined based on the identity of the user of washing machine appliance 100. In this regard, washing machine appliance 100 may include one or more sensors (e.g., such as biometric sensors or scanners) and may identify who is using washing machine appliance 100. By contrast, each user may enter a particular code or use a particular passkey to identify themselves prior to use. Other manners of identifying a particular user are possible and within scope the present subject matter, and the desired level of automation may be based at least in part on the identity of the user.

According to exemplary embodiments, the desired level of automation may correspond to or be associated with the desired level of the user interaction with washing machine appliance 100. As explained in more detail below, FIGS. 5 through 7 illustrate exemplary levels of automation, where "activated" controls are illustrated in solid lines, while "deactivated" controls are illustrated in phantom or by dotted lines. Thus, the activated controls are displayed to a user and permit user interaction, while the deactivated controls cannot be manipulated by the user. It should be appreciated that when the plurality of controls 186 are touchscreens or digital displays, activated control may be illuminated, displayed, or otherwise emphasized while deactivated controls may be removed from the screen, displayed in a different color, or otherwise deemphasized. By contrast, when the plurality of controls 186 are tactile buttons with or without associated displays, activated buttons may be backlit or otherwise emphasized while deactivated buttons may remain dark and cannot be manipulated.

For example, a user may select a "no automation" mode or automation level where substantially all of the operating parameters of an operating cycle are input directly or controlled by the user. According to such an embodiment, control panel 150 may provide all of the plurality controls 186 for interaction or otherwise prompt a user for input regarding each of the parameters regulated by the plurality of controls 186. For example, FIG. 5 illustrates control panel 150 when the no automation or manual mode has been selected. As shown, all of the plurality of controls 186 are activated and modifiable by a user of washing machine appliance 100. According to exemplary embodiments, washing machine appliance 100 may require a user to actively select one parameter from each of the plurality controls 186 before an operating cycle may commence. By contrast, according to alternative embodiments, each of the plurality of controls 186 may have a default condition or operating parameter selected and a user may be prompted to change each parameter if desired.

Referring now briefly to FIG. 6, control panel 150 is illustrated when a standard level or moderate level of control is selected as the desired automation level. As shown, fewer than all of the plurality of controls 186 may be manipulated by a user of washing machine appliance 100 (e.g., less control relative to the manual mode of operation). For example, in this mode, the user may be permitted to input the load type and select a wash temperature, but the soil level and other cycle modifiers may not be manipulated and may be determined by the controller or automated algorithms. In this regard, for example, washing machine appliance 100 may implement algorithms for determining desired or optimal cycle parameters in situations where a user does not positively select such cycle parameters. FIG. 7 illustrates control panel 150 under a full automation mode, e.g., where a user does not wish to have any input regarding the cycle parameters. Thus, as shown in FIG. 7, all the plurality of controls 186 are deactivated and the user's only option is to load the wash basket 114 and press start button 184, thereby initiating a fully automated cycle where controller 156 may implement one or more algorithms to determine the optimum cycle parameters and perform the wash cycle in accordance with those parameters.

Step 220 includes determining a set of active controls of a plurality of controls on the control panel. For example, the set of active controls are those controls of the plurality of controls 186 that are activated and may be associated with the selected automation level (e.g., selected by rotary dial 182). After the set of active controls are determined, step 230 may include activating the set of active controls on the control panel to permit manipulation by a user of the washing machine appliance 100. In addition, according to exemplary embodiments, method 200 may further include, at step 240, deactivating a set of deactivated controls on the control panel, the set of deactivated controls being those controls from the plurality of controls that are not included within the set of active controls.

Notably, depending on the desired automation level (e.g., based on the position of rotary dial 182), a user may regulate which of the plurality of controls 186 are activated and deactivated in accordance with user preference. The user may then manipulate the operating cycle parameters associated with the set of active controls to set the operating cycle parameters as desired for the immediately subsequent operating cycle. After the active controls 186 are selected, step 250 may include initiating an operating cycle based on the parameters selected when the start button is pressed. In this regard, after all the operating parameters are set as desired, operation of washing machine appliance 100 may be initiated by the user. It should be appreciated that according to exemplary embodiments, controller 156 of washing machine appliance 100 may implement certain control algorithms to regulate the operation of washing machine appliance 100 as necessary and in accordance with the selected operating parameters to achieve the desired performance of washing machine appliance 100.

FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 is explained using washing machine appliance 100 as an example, it should be appreciated that this method may be applied to the operation of any suitable laundry appliance, such as another washing machine appliance or a dryer appliance.

Control panel 150 and the method 200 of operating washing machine appliance 100 as described above provides an improved interface for permitting user interaction with washing machine appliance 100. In this regard, control panel 150 may populate and depopulate input selectors or buttons based on a user's desired amount of autonomy or automation for their washing machine. In this regard, users who like full control may be provided with all wash options for selection while those who want to provide minimal input will have a reduced number of cycle selections available to them, the remaining being controlled by standard washing machine control algorithms. As a result, washing machine appliance 100 may provide improved versatility in a variety of applications with improved overall consumer satisfaction and machine performance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry appliance comprising:
   a cabinet;
   a basket rotatably mounted within the cabinet and defining a chamber configured for receiving a load of clothes;
   a control panel mounted on the cabinet, the control panel comprising a plurality of controls, wherein each of the plurality of controls may be activated to permit manipulation by a user or deactivated to prevent manipulation by the user; and
   a controller operably coupled to the control panel, the controller being configured to:
      obtain a desired automation level;
      determine a set of active controls of the plurality of controls that are associated with the desired automation level; and
      activate the set of active controls on the control panel for manipulation by the user of the laundry appliance.

2. The laundry appliance of claim 1, wherein obtaining the desired automation level comprises:
   determining the position of a primary control input.

3. The laundry appliance of claim 2, wherein the primary control input comprises a rotary dial.

4. The laundry appliance of claim 1, wherein obtaining the desired automation level comprises:
identifying the user of the laundry appliance; and
determining the desired automation level based at least in part on an identity of the user of the laundry appliance.

5. The laundry appliance of claim 1, wherein the desired automation level comprises a full automation level wherein all of the plurality of controls are deactivated.

6. The laundry appliance of claim 5, wherein the desired automation level comprises a minimal automation level wherein the set of active controls comprises more controls than the full automation level.

7. The laundry appliance of claim 6, wherein the minimal automation level provides for the selection of a load type, a water temperature, and a soil level.

8. The laundry appliance of claim 6, wherein the desired automation level comprises a moderate automation level wherein the set of active controls comprises more controls than the full automation level and fewer controls than the minimal automation level.

9. The laundry appliance of claim 8, wherein the moderate automation level provides for the selection of one of a load type, a water temperature, or a soil level.

10. The laundry appliance of claim 1, further comprising a start button, wherein the controller is further configured to:
initiate an operating cycle based on parameters selected using the set of active controls when the start button is pressed.

11. The laundry appliance of claim 1, wherein the controller is further configured to:
implement automated algorithms for a set of deactivated controls of the plurality of controls.

12. The laundry appliance of claim 1, wherein the desired automation level may be programmed by the user of the laundry appliance.

13. The laundry appliance of claim 1, wherein the controller is further configured to:
deactivate a set of deactivated controls on the control panel, the set of deactivated controls being those controls from the plurality of controls that are not included within the set of active controls.

14. The laundry appliance of claim 1, wherein the control panel comprises:
a touch screen interface.

15. The laundry appliance of claim 1, wherein the control panel comprises:
one or more toggle switches, push buttons, rotary dials, or selective knobs.

16. The laundry appliance of claim 1, wherein the laundry appliance is a washing machine appliance or a dryer appliance.

17. A method of operating a laundry appliance, the laundry appliance comprising a cabinet and a control panel mounted on the cabinet, the control panel comprising a plurality of controls, wherein each of the plurality of controls may be activated to permit manipulation by a user or deactivated to prevent manipulation by the user, the method comprising:
obtaining a desired automation level;
determining a set of active controls of the plurality of controls that are associated with the desired automation level; and
activating the set of active controls on the control panel for manipulation by the user of the laundry appliance.

18. The method of claim 17, wherein obtaining the desired automation level comprises:
identifying the user of the laundry appliance; and
determining the desired automation level based at least in part on an identity of the user of the laundry appliance.

19. The method of claim 17, wherein the desired automation level comprises a full automation level wherein all of the plurality of controls are deactivated.

20. The method of claim 17, wherein the laundry appliance further comprises a start button, the method further comprising:
initiating an operating cycle based on parameters selected using the set of active controls when the start button is pressed.

* * * * *